United States Patent
Tsai et al.

(10) Patent No.: US 9,094,099 B2
(45) Date of Patent: Jul. 28, 2015

(54) BASEBAND MODULE, MOBILE DEVICE INCLUDING THE BASEBAND MODULE, AND METHOD OF SIGNAL TRANSMISSION IN A MOBILE DEVICE

(71) Applicants: Irene Tsai, New Taipei (TW); Yi-Fen Chou, Keelung (TW)

(72) Inventors: Irene Tsai, New Taipei (TW); Yi-Fen Chou, Keelung (TW)

(*) Notice: Subject to any disclaimer, the term of this patent is extended or adjusted under 35 U.S.C. 154(b) by 115 days.

(21) Appl. No.: 13/923,628

(22) Filed: Jun. 21, 2013

(65) Prior Publication Data
US 2014/0004903 A1 Jan. 2, 2014

(30) Foreign Application Priority Data
Jun. 27, 2012 (TW) .............................. 101123033 A

(51) Int. Cl.
*H04B 1/38* (2015.01)
*H04B 1/3816* (2015.01)
*G06F 13/38* (2006.01)
*H04M 1/725* (2006.01)
*H04M 1/00* (2006.01)

(52) U.S. Cl.
CPC ............ *H04B 1/3816* (2013.01); *G06F 13/385* (2013.01); *H04M 1/72522* (2013.01); *G06F 2213/3804* (2013.01); *G06F 2213/3806* (2013.01); *H04M 2250/14* (2013.01)

(58) Field of Classification Search
CPC ..................... H04M 2250/14; H04B 1/3816
USPC .......................................................... 455/558
See application file for complete search history.

(56) References Cited

FOREIGN PATENT DOCUMENTS

| CN | 202135121 | 2/2012 |
|----|-----------|--------|
| EP | 2075744   | 7/2009 |
| EP | 2251986   | 11/2010 |
| GB | 2346245   | 8/2000 |

OTHER PUBLICATIONS

European Search Report; Oct. 9, 2013; App. No. 13173624.1; Reference No. 13TSI0206EPP.

*Primary Examiner* — Eugene Yun
(74) *Attorney, Agent, or Firm* — SmithAmundsen LLC; Kelly J. Smith; Dennis S. Schell

(57) ABSTRACT

A mobile device includes an electronic card slot to be connected to an electronic card, and a baseband module. The baseband module includes a baseband unit, a switching unit, and a control unit. When it is determined by the control unit that the electronic card conforms with a subscriber identification communication protocol, the baseband unit and the electronic card slot are electrically interconnected via the switching unit such that the baseband unit is able to communicate with the electronic card that is connected to the electronic card slot. When the determination is otherwise, the baseband unit and the electronic card slot are electrically interconnected via the control unit.

20 Claims, 11 Drawing Sheets

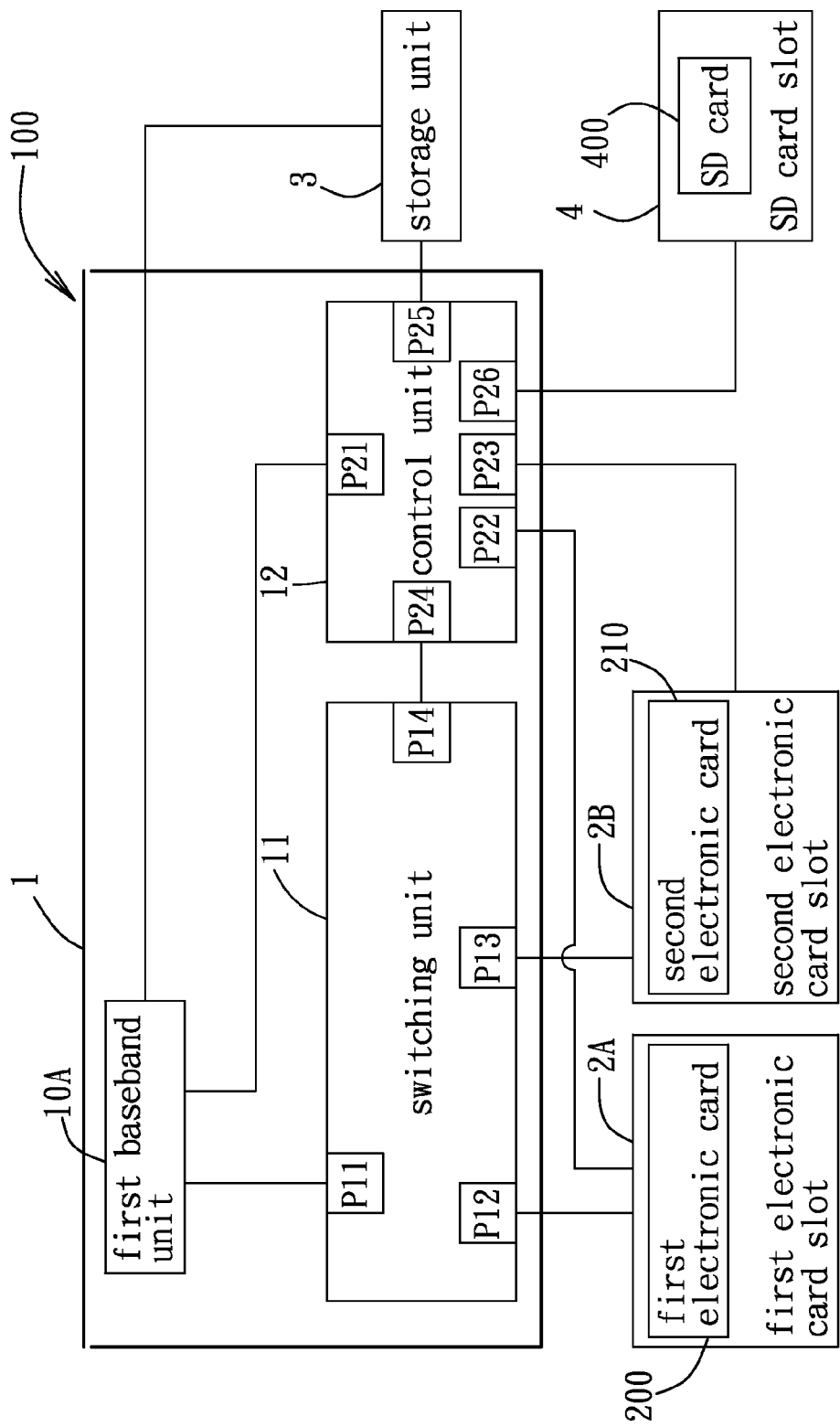
F I G. 4

BASEBAND MODULE, MOBILE DEVICE INCLUDING THE BASEBAND MODULE, AND METHOD OF SIGNAL TRANSMISSION IN A MOBILE DEVICE

CROSS-REFERENCE TO RELATED APPLICATION

This application claims priority of Taiwanese Application No. 101123033, filed on Jun. 27, 2012.

BACKGROUND OF THE INVENTION

1. Field of the Invention

The invention relates to a mobile device that is able to communicate with various externally connected electronic cards via software-controlled electronic components.

2. Description of the Related Art

FIG. 1 is a schematic block diagram of a conventional mobile device 900. The mobile device 900 includes a baseband module 910, two electronic card slots 920 coupled to the baseband module 910, and a secure digital (SD) card slot 930 coupled to the baseband module 910 and to be connected to a SD card. A subscriber identity module (SIM) card is typically provided by a telephony service provider for authenticating a subscriber, and may be removably connected to one of the electronic card slots 920 for communication with the baseband module 910.

Generally, the SIM card employs a communication protocol that is different from that employed by the SD card, and therefore cannot communicate directly with the SD card. Moreover, since that the electronic card slots 920 are only coupled with the baseband module 910, electronic cards other than the SIM card may not be able to communicate with the mobile device via the electronic card slots 920.

However, in view of rapid expansion in functionality of the mobile device 900, it may be increasingly desirable to connect various electronic cards to the mobile device 900, and/or to allow communication between the electronic card slots 920 and the SD card slot 930.

SUMMARY OF THE INVENTION

Therefore, it is an object of the present invention to provide a mobile device that enables communication with various electronic cards via electronic card slots thereof.

Accordingly, a mobile device of the present invention comprises an electronic card slot and a baseband module.

The electronic card slot is to be connected to an electronic card. The baseband module includes a baseband unit that includes an application processor and a baseband processor, a switching unit coupled to the baseband unit and the electronic card slot, and a control unit coupled to the baseband unit, the electronic card slot, and the switching unit.

The control unit of the baseband module is configured to operate in a first transmission mode when it is determined by the control unit that the electronic card conforms with a subscriber identification communication protocol, and a second transmission mode when it is determined by the control unit that the electronic card does not conform with the subscriber identification communication protocol.

In the first transmission mode, the baseband unit and the electronic card slot are electrically interconnected via the switching unit such that the baseband unit is able to communicate with the electronic card that is connected to the electronic card slot. In the second transmission mode, the baseband unit and the electronic card slot are electrically interconnected via the control unit.

Another object of the present invention is to provide a baseband module that is for use in mobile device.

Accordingly, a baseband module of the present invention is for communicating with an electronic card connected to an electronic card slot. The baseband module comprises a baseband unit, a switching unit coupled to the baseband unit and to be coupled to the electronic card slot, and a control unit coupled to the baseband unit and the switching unit, and to be coupled to the electronic card slot.

The control unit of the baseband module is configured to operate in a first transmission mode when it is determined by the control unit that the electronic card conforms with a subscriber identification communication protocol, and a second transmission mode when it is determined by the control unit that the electronic card does not conform with the subscriber identification communication protocol.

In the first transmission mode, the baseband unit and the electronic card slot are electrically interconnected via the switching unit such that the baseband unit is able to communicate with the electronic card that is connected to the electronic card slot. In the second transmission mode, the baseband unit and the electronic card slot are electrically interconnected via the control unit.

Yet another object of the present invention is to provide a method for signal transmission to be implemented by the aforesaid baseband module.

Accordingly, a method for signal transmission is to be implemented by a baseband module of a mobile device. The mobile device includes an electronic card slot coupled to the baseband module and to be connected to an electronic card, and a storage unit coupled to the baseband module. The baseband module includes a baseband unit, a switching unit and a control unit. The method comprises the following steps of:

configuring the baseband module to operate in a first transmission mode, in which the baseband unit and the electronic card slot are electrically interconnected via the switching unit such that the baseband unit is able to communicate with the electronic card that is connected to the electronic card slot, when it is determined by the control unit that the electronic card conforms with a subscriber identification communication protocol; and configuring the baseband module to operate in a second transmission mode, in which the baseband unit and the electronic card slot are electrically interconnected via the control unit, when it is determined by the control unit that the electronic card does not conform with the subscriber identification communication protocol.

BRIEF DESCRIPTION OF THE DRAWINGS

Other features and advantages of the present invention will become apparent in the following detailed description of the preferred embodiments with reference to the accompanying drawings, of which:

FIG. 4 is a schematic block diagram of the mobile device of FIG. 2, according to an example;

DETAILED DESCRIPTION OF THE PREFERRED EMBODIMENTS

Figure 1:
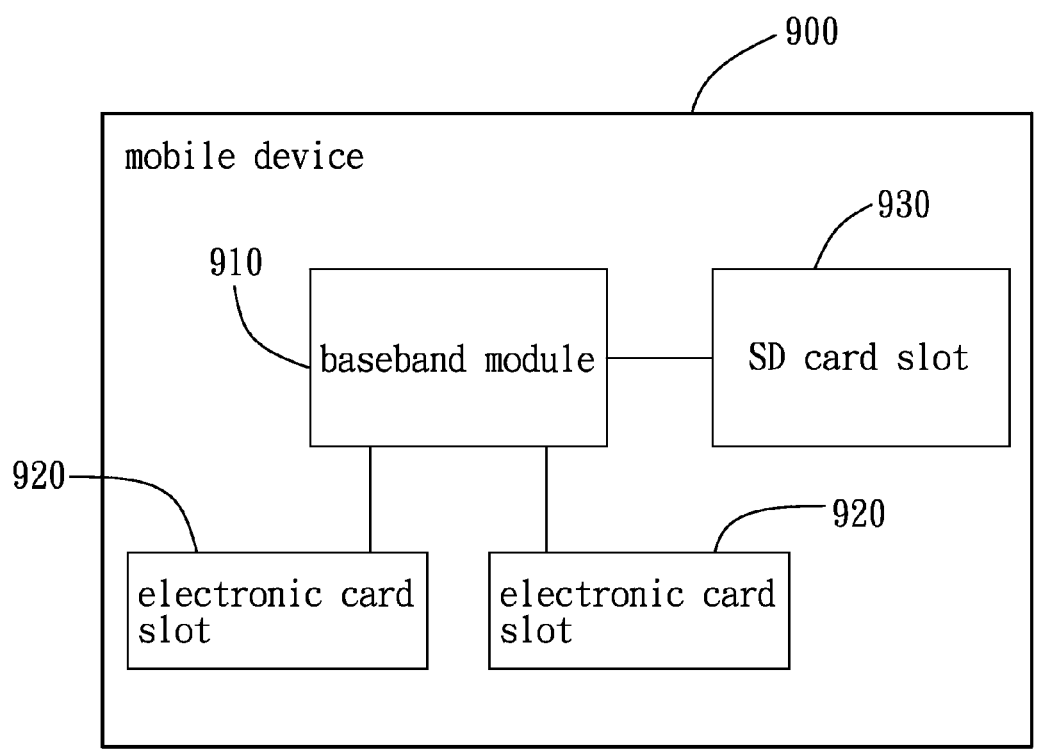
FIG. 1 is a schematic block diagram of a conventional mobile device.

Before the present invention is described in greater detail, it should be noted that like elements are denoted by the same reference numerals throughout the disclosure.

Figure 2:
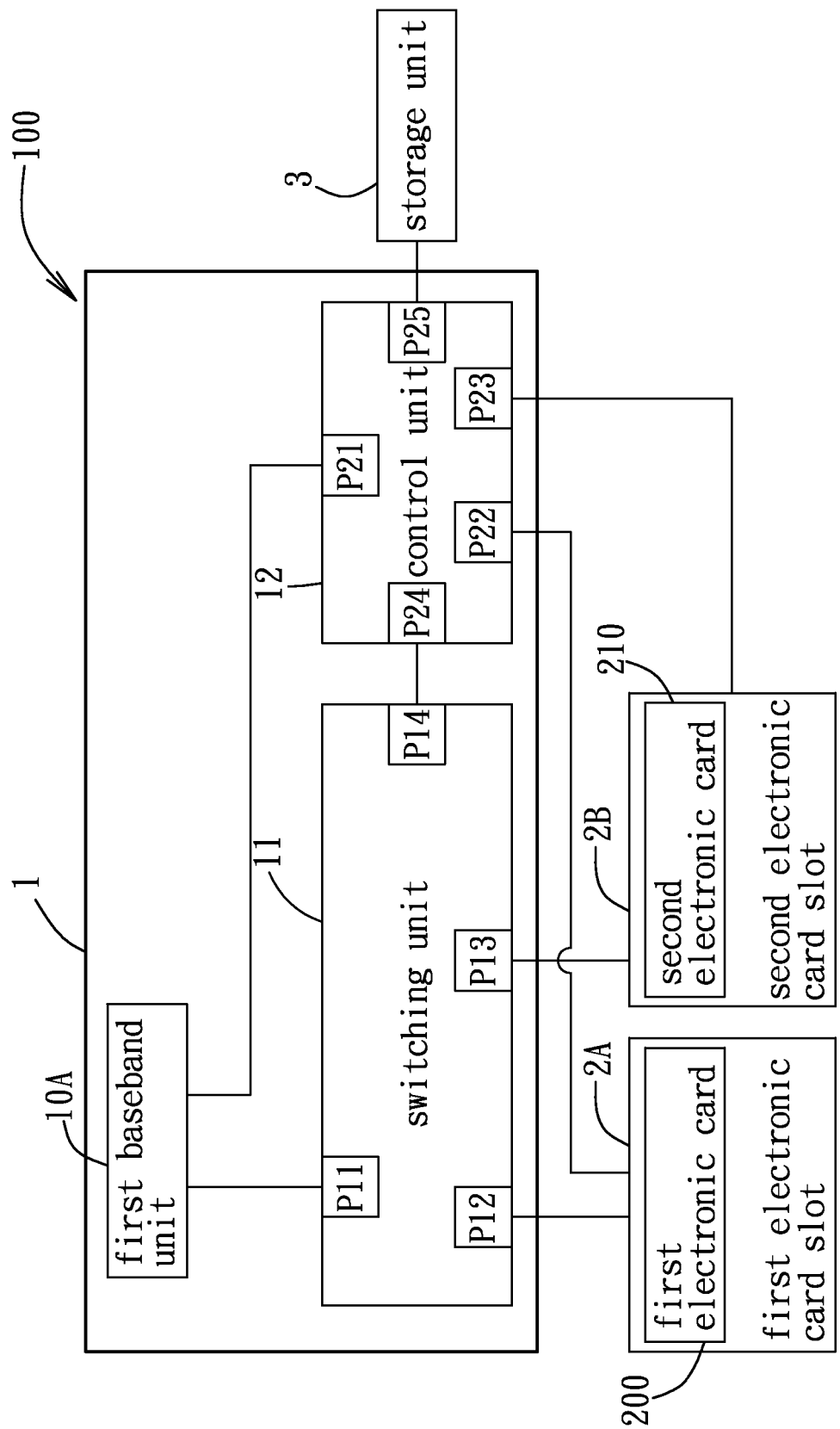
FIG. 2 is a schematic block diagram of a mobile device according to a first preferred embodiment of the present invention.

As shown in FIG. 2, the first preferred embodiment of a mobile device 100 according to the present invention can be a mobile phone or a personal digital assistant (PDA) that is able to access mobile telephony through a subscriber identity module (SIM) card. The mobile device 100 comprises a baseband module 1, at least one electronic card slot that is coupled to the baseband module 1 and is to be connected to an electronic card 200, and a storage unit 3 coupled to the baseband module 1. In this embodiment, two electronic card slots, namely a first electronic slot 2A and a second electronic card 2B, are employed for connection to first and second electronic cards 200 and 210, respectively. Each of the first and second electronic cards 200 and 210 can be one of a SIM card and an Europay, MasterCard or Visa (EMV) bank card. The storage unit 3 may be implemented using one of hardware, software and a combination thereof, and is stored with at least one executable program such as an operating system (OS), an application (APP), a JAVA applet, etc.

The baseband module 1 is an input/output device that supports ISO 7816/Universal Asynchronous Receiver/Transmitter (UART) specification, and includes a first baseband unit 10A, a switching unit 11 coupled to the first baseband unit 10A and the electronic card slots 2A and 2B, and a control unit 12 coupled to the first baseband unit 10A, the first and second electronic card slots 2A and 2B, and the switching unit 11. The first baseband unit 10A may include an application processor (not shown in the Figures) that provides software management, such as executing the OS and/or a booting sequence. The first baseband unit 10A may also include a baseband processor (not shown in the Figures) for handling radio functions, such as telephone and/or text message.

Specifically, the switching unit 11 has a plurality of transmission ports P11-P14, and the control unit 12 has a plurality of transmission ports P21-P25. The switching unit 11 is coupled to the first baseband unit 10A, the first and second electronic card slots 2A and 2B, and the control unit 12 via the transmission ports P11 to P14, respectively. The control unit 12 is coupled to the first baseband unit 10A, the first and second electronic card slots 2A and 2B, the switching unit 11 and the storage unit 3 via the transmission ports P21 to P25, respectively.

When the mobile device 100 is powered up, the control unit 12 is operable to determine whether each of the first and second electronic cards 200 and 210 connected to a respective one of the first and second electronic card slots 2A and 2B conforms with a subscriber identification communication protocol. In this embodiment, the subscriber identification communication protocol is for authenticating a subscriber of a mobile telephony service provider, and an electronic card that conforms with the subscriber identification communication protocol can be considered as a SIM card.

When it is determined that at least one of the first and second electronic cards 200 and 210 conforms with a subscriber identification communication protocol, the baseband module 1 is configured to operate in a first transmission mode, in which the first baseband unit 10A and one of the first and second electronic card slots 2A and 2B are electrically interconnected via the switching unit 11. Specifically, the first baseband unit 10A is connected to the switching unit 11 via the transmission port P11, and the electronic card slot 2A or 2B that is connected to the electronic cards 200 or 210 conforming with the subscriber identification communication protocol is connected to the baseband module 1 via the respective transmission port P12 or P13.

Therefore, the first baseband unit 10A is able to communicate with the one of the first and second electronic cards 200 and 210 that is connected to the one of the first and second electronic card slots 2A and 2B. The mobile device 100 is subsequently able to perform operations related to the mobile telephony service, such as making a phone call, transmitting a text message, surfing the Internet, etc.

In some examples, the switching unit 11 is configured to connect to the storage unit 3 via the transmission ports P14, P24 and P25 in the first transmission mode, such that one of the first baseband unit 10A, and the one of the first and second electronic card slots 2A and 2B, can be connected to the storage unit 3 via the switching unit 11.

It should be noted that, in the case that both of the first and second electronic cards 200 and 210 conform with the subscriber identification communication protocol, the control unit 12 is configured to operate in the aforesaid manner for both of the first and second electronic cards 200 and 210. That is, the electronic card slots 2A and 2B are connected to the baseband module 1 via the transmission ports P12 and P13, respectively.

In some examples, the transmission ports that are not being used (in this case, the transmission ports P22 and P23) can be temporarily deactivated to block signal transmission.

On the other hand, an electronic card that does not conform with the subscriber identification communication protocol is considered as unrelated to a SIM card, and therefore requires to be connected via another component of the mobile device 100 for performing the operations associated with the electronic card, such as online transaction or other operations concerning electronic commerce (E-commerce).

When it is determined that at least one of the first and second electronic cards 200 and 210 does not conform with the subscriber identification communication protocol, the baseband module 1 is configured to operate in a second transmission mode, in which the first baseband unit 10A and one of the first and second electronic card slots 2A and 2B are electrically interconnected via the control unit 12. Specifically, the first baseband unit 10A is connected to the control unit 12 via the transmission port P21, and the electronic card slot 2A or 2B that is connected to the first and second electronic cards 200 or 210 not conforming with the subscriber identification communication protocol is connected to the baseband module 1 via the respective transmission ports P22 or P23.

In some examples, the control unit 12 is configured to connect to the storage unit 3 via the transmission port P25 in the second transmission mode, such that one of the first baseband unit 10A, and the one of the first and second electronic card slots 2A and 2B, can be connected to the storage unit 3 via the control unit 12.

It should be noted that, in the case that both of the first and second electronic cards 200 and 210 do not conform with the subscriber identification communication protocol, the control unit 12 is configured to operate in the aforesaid manner for both of the first and second electronic cards 200 and 210. That is, the electronic card slots 2A and 2B are connected to the baseband module 1 via the transmission ports P22 and P23, respectively. Additionally, in this case, the control unit 12 is further operable in a third transmission mode, in which the first and second electronic card slots 2A and 2B are electrically interconnected via the control unit 12 such that the first and second electronic cards 200 and 210 connected respectively to the first and second electronic card slots 2A and 2B are able to communicate with each other. That is, the transmission ports P22 and P23 are connected to each other.

In some examples, the executable program stored in the storage unit 3 can be downloaded by the baseband module 1 and executed by the control unit 12 so as to produce a control signal. In turn, in each of the first and second transmission modes, the control unit 12 is configured to determine the two of the first baseband unit 10A, the first and second electronic cards 200 and 210 that are connected to a respective one of the first and second electronic card slots 2A and 2B, and the storage unit 3 to be electrically interconnected based on the control signal.

In short, for an electronic card connected to one of the first and second electronic card slots 2A and 2B, the control unit 12 determines whether the electronic card conforms with the subscriber identification communication protocol. When the determination is affirmative, the switching unit 11 is configured to arrange the communication between the electronic card and other components of the mobile device 100. Otherwise, the control unit 12 is configured to arrange the communication between the electronic card and other components of the mobile device 100. As a result, the mobile device 100 is able to communicate with various electronic cards connected to the first and second electronic card slots 2A and 2B.

In some examples, the switching unit 11 and the control unit 12 are integrated with each other using one of hardware, software and a combination thereof. For example, the switching unit 11 and the control unit 12 can be embodied using software or firmware, or can be implemented into a physical circuit block such as application-specific integrated circuit (ASIC), field-programmable gate array (FPGA), etc. Therefore, it may not be necessary to alter the hardware infrastructure of a conventional mobile device 100 in order to provide the functionalities as specified above.

Figure 3A:
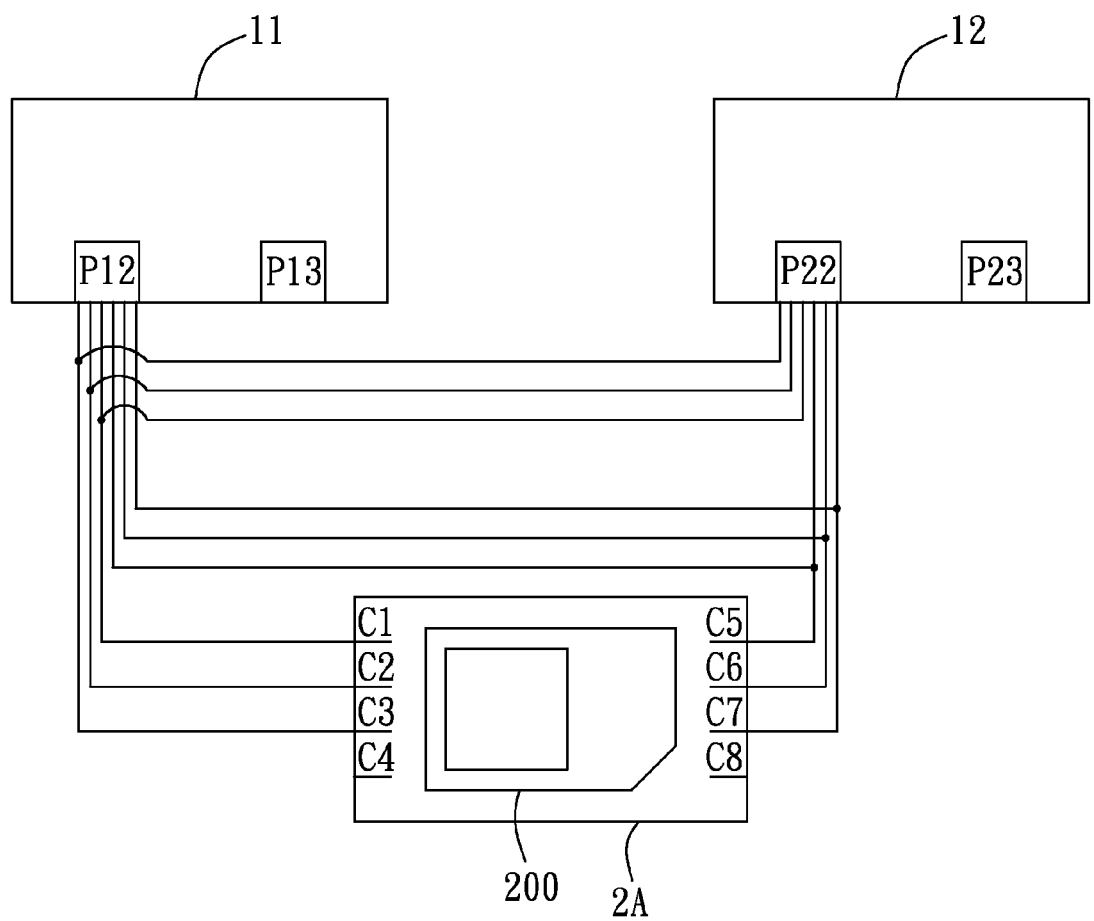
FIGS. 3A and 3B are schematic views of pin connections between first and second electronic cards and first and second electronic card slots of the mobile device, respectively.
Figure 3B:
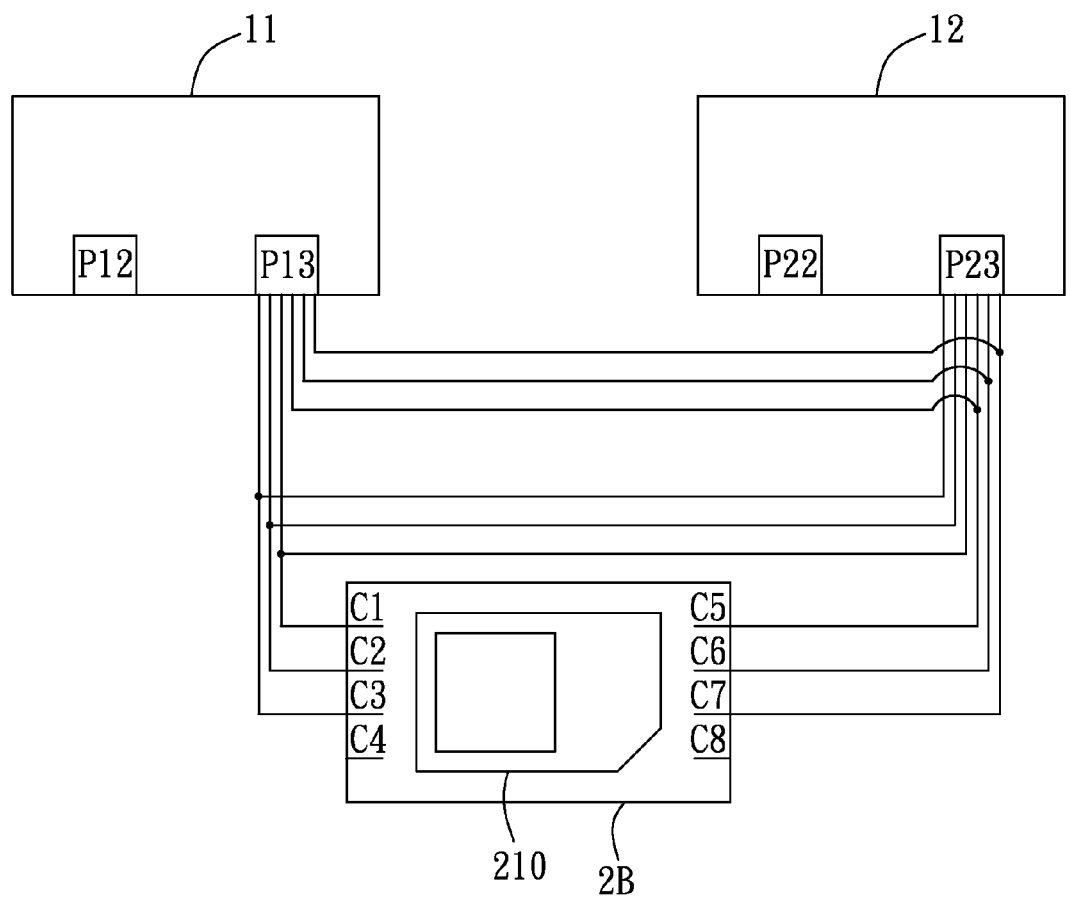

Further referring to FIGS. 3A and 3B, in this embodiment, each of the first and second electronic card slots 2A and 2B includes eight pins C1-C8 for connecting electrically to the first and second electronic cards 200 and 210, and for connecting to the baseband module 1. The respective functionalities of the pins are as follows: C1 is a power pin, C2 is a reset pin, C3 is a clock signal pin, C5 is a ground pin, C6 is an internal programming voltage pin, C7 is a signal input/output (I/O) pin, and each of C4 and C8 is a reserve pin which may be in a floating state. In some examples where the electronic device 100 does not have the required number of pins to accommodate C4 and C8 (such as iPhone 5), the pins C4 and C8 can be omitted.

In the particular example illustrated in FIGS. 3A and 3B, the pins C1 to C3, and the pins C5 to C7 of the first electronic card slot 2A are electrically connected to the transmission ports P12 and P22. Likewise, the pins C1 to C3, and the pins C5 to C7 of the second electronic card slot 2B are electrically connected to the transmission ports P13 and P23.

In some examples, the mobile device 100 may further comprise a secure digital (SD) card slot 4 coupled to the control unit 12 and to be connected to an SD card 400, as shown in FIG. 4. In such examples, the control unit 12 further includes a transmission port P26 for coupling to the SD card slot 4.

For the cases where the SD card slot 4 and the SD card 400 are present, in the first transmission mode, two of the first baseband unit 10A, the at least one of the first and second electronic cards 200 and 210 that is connected to a respective one of the first and second electronic card slots 2A and 2B, the storage unit 3, and the SD card 400 that is connected to the SD card slot 4 are electrically interconnected via the switching unit 11 for communicating with each other. Likewise, in the second transmission mode, two of the first baseband unit 10A, the at least one of the first and second electronic cards 200 and 210 that is connected to a respective one of the first and second electronic card slots 2A and 2B, the storage unit 3, and the SD card 400 that is connected to the SD card slot 4 are electrically interconnected via the control unit 12 for communicating with each other.

Figure 5:
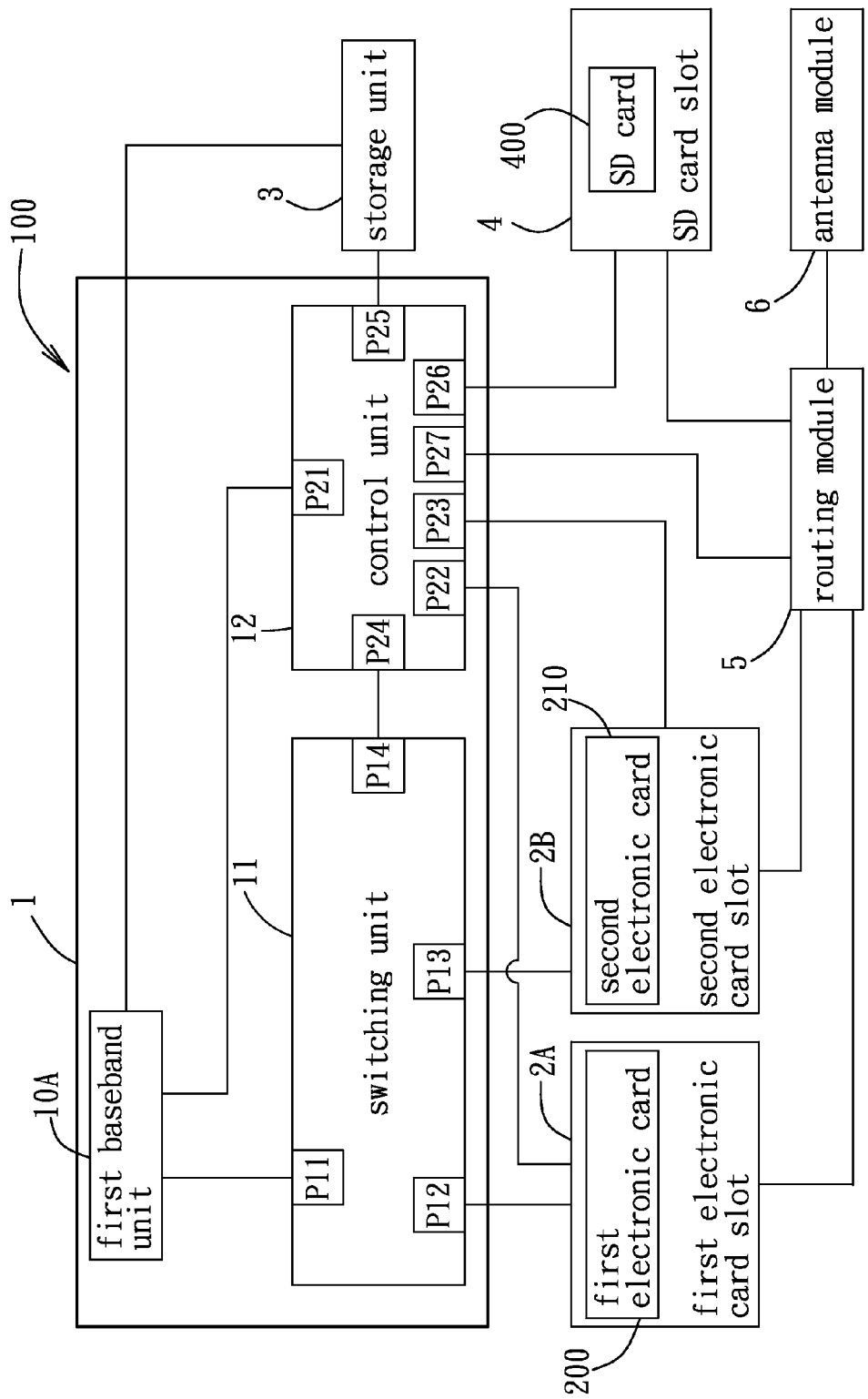
FIG. 5 is a schematic block diagram of the mobile device of FIG. 2, according to another example.

In some examples, the mobile device 100 may further comprise a routing module 5 and an antenna module 6 coupled to the routing module 5, as shown in FIG. 5. The routing module 5 is coupled to the first and second electronic card slots 2A and 2B and the SD card slot 4. In such examples, the control unit 12 further includes a transmission port P27 for coupling to the routing module 5 so as to control operation of the routing module 5 to electrically connect the antenna module 6 to one of first and second electronic card slots 2A and 2B and the SD card slot 4. In some examples, the SD card slot 4 may be disconnected from the routing module 5 and is accessible solely through the control unit 12.

In the particular example illustrated in FIG. 5, the routing module 5 is one of a multiplexer and an analog switch component. The antenna module 6 is a non-contact antenna circuit module that supports radio-frequency identification (RFID) and ISO14443 specification. The connection between the antenna module 6 and each of the first and second electronic card slots 2A and 2B can be via the respective pins C4 and C8.

Figure 6:
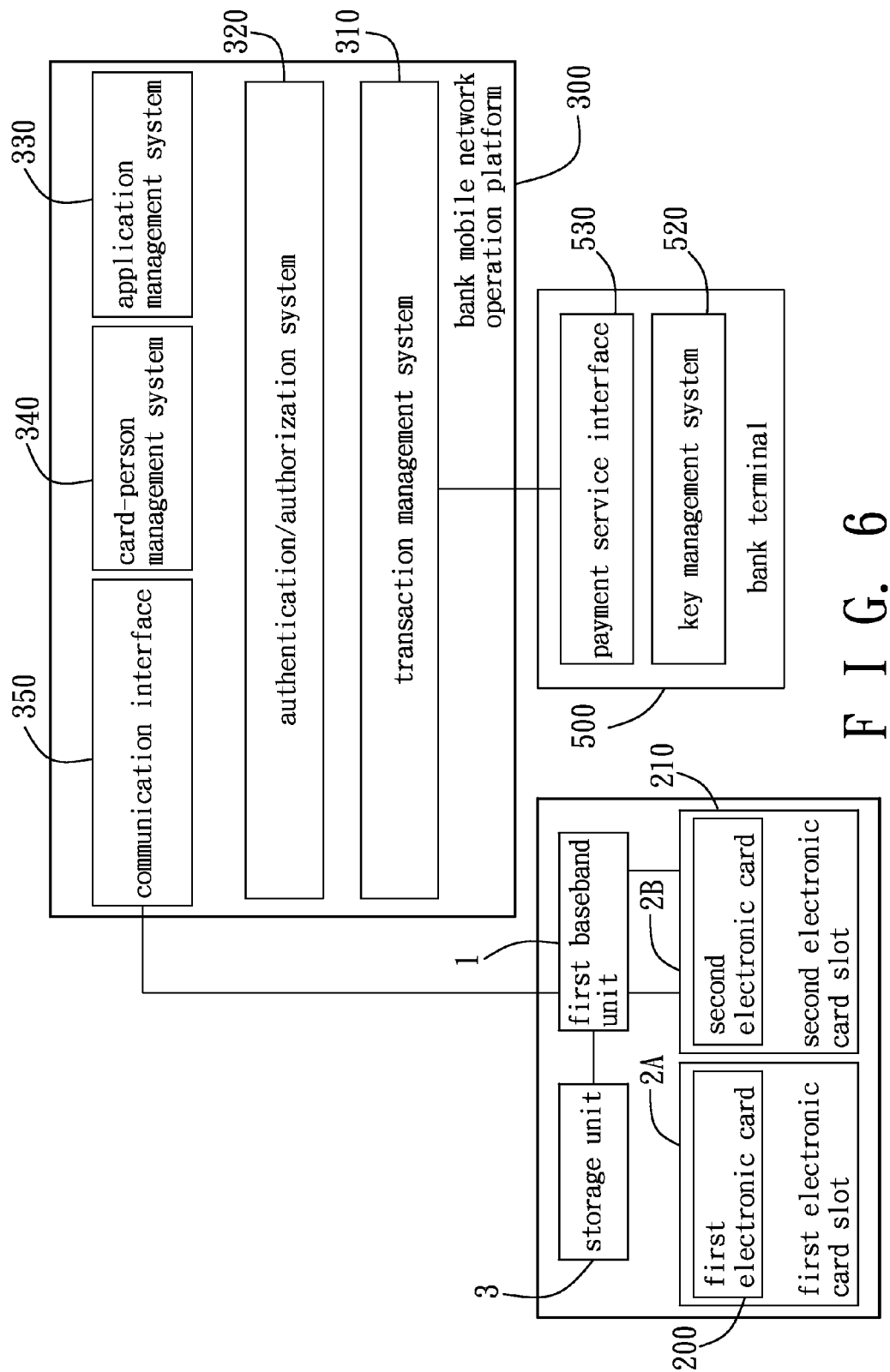
FIG. 6 is a schematic block diagram of the mobile device communicating with a bank terminal via a bank mobile network operation platform, according to another example.

The mobile device 100 of this embodiment is operable to communicate with an external wireless system such as a bank mobile network operation platform 300 shown in FIG. 6. The bank mobile network operation platform 300 is in communication with a bank terminal 500 associated with a specific bank for processing online transactions. The specific bank provides bank cards (which, in this embodiment, can be one of the electronic cards 200 and 210) to its customers, and the bank terminal 500 includes a key management system 520 for managing the authentication information between the bank cards and the users, and a payment service interface 530 coupled to the bank mobile network operation platform 300, with which the mobile device 100 also communicates.

The bank mobile network operation platform 300 includes a transaction management system 310, an authentication/authorization system 320, an application management system 330, a card-person management system 340 and a communication interface 350 for coupling to the baseband module 1 of the mobile device 100.

The transaction management system 310 is coupled to the payment service interface 530, and is operable to transmit information therewith. One of a symmetric-key algorithm and an asymmetric-key algorithm can be employed for more secured information transmission.

The authentication/authorization system 320 is for managing authentication information of the mobile devices that connect to the bank mobile network operation platform 300.

The application management system 330 is stored with a plurality of executable programs, which can be downloaded to the storage unit 3.

The card-person management system 340 is stored with the personal information associated with the customers of the specific bank.

The communication interface 350 is coupled to the baseband module 1 of the mobile device 100, and is operable to transmit information therewith, using one of a text message, general packet radio service (GPRS), internet protocol suite (TCP/IP), etc.

Figure 7:
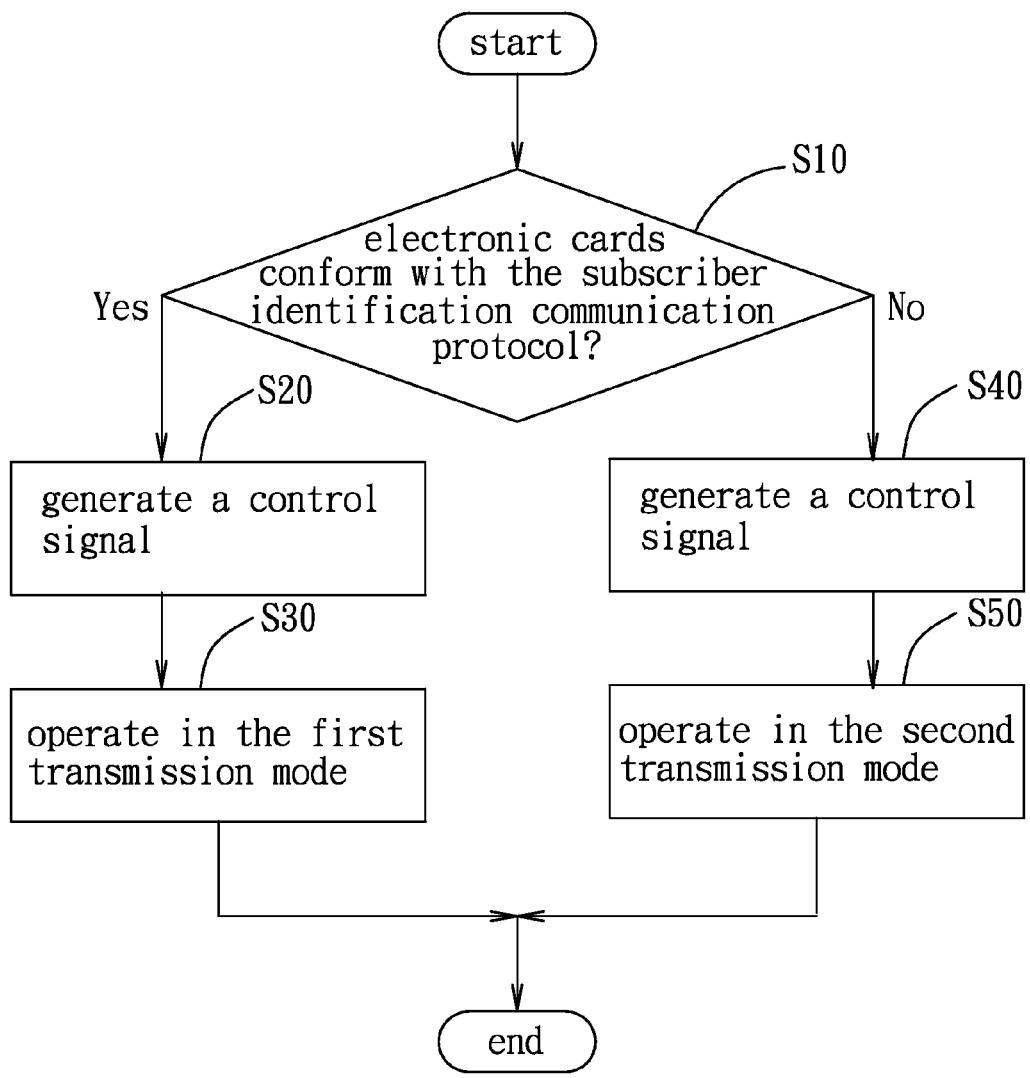
FIG. 7 is a flow chart illustrating a method for signal transmission that is performed by the mobile device for communicating with the bank mobile network operation platform.

The succeeding paragraphs, in conjunction with a flowchart shown in FIG. 7, are directed to a method for signal transmission that is performed by the mobile device 100 for communicating with the bank mobile network operation platform 300 as illustrated by FIG. 6. In the method, the first electronic card 200 is a SIM card (i.e., conforms with the subscriber identification communication protocol), and the second electronic card 210 is an EMV bank card associated with the bank mobile network operation platform 300 (i.e., does not conform with the subscriber identification communication protocol).

In step S10, the control unit 12 is operable to determine whether each of the first and second electronic cards 200 and 210 conforms with the subscriber identification communication protocol. It is noted that, in some examples, this step can be performed manually by the user of the mobile device 100. That is, the user may provide the mobile device 100 with information of the first and second electronic cards 200 and 210. For each of the first and second electronic cards 200 and 210, when the determination is affirmative, the flow proceeds to step S20. Otherwise, the flow proceeds to step S40. The result regarding the determination can be stored in an input/output (I/O) service list (not shown in the Figures) which can be provided to the user for reference.

In step S20, the baseband module 1 is operable to download the executable program from the application management system 330 via the communication interface 350, and to store the executable program in the storage unit 3. In this case, the particular executable program that the baseband module 1 downloads is a SIM application associated with the first electronic card 200 which is a SIM card. The control unit 12 is operable to execute the SIM application so as to generate a control signal. In the cases where the SIM application is already stored in the storage unit 3, the downloading may be omitted.

Afterwards, in step S30, the control unit 12 is controlled by the control signal to operate in the first transmission mode. Accordingly, two of the first baseband unit 10A, the first electronic card 200 connected to the first electronic card slot 2A, the storage unit 3, and the SD card 400 that is connected to the SD card slot 4 are electrically interconnected via the switching unit 11 for communicating with each other.

Similar to step S20, in step S40, the baseband module 1 is operable to download the executable program from the application management system 330 via the communication interface 350, and to store the executable program in the storage unit 3. In this case, the particular executable program that the baseband module 1 downloads is an EMV application associated with the second electronic card 210 which is an EMV card. The control unit 12 is then operable to execute the EMV application so as to generate the control signal. In the cases where the EMV application is already stored in the storage unit 3, the downloading may be omitted.

Afterwards, in step S50, the control unit 12 is controlled by the control signal to operate in the second transmission mode. Accordingly, two of the first baseband unit 10A, the second electronic card 210 connected to the second electronic card slot 2B, the storage unit 3, and the SD card 400 that is connected to the SD card slot 4 are electrically interconnected via the control unit 12 for communicating with each other.

In the case where the second electronic card 210 and the storage unit 3 are electrically interconnected, the second electronic card 210 may interact with the EMV application, and may transmit information related to the interaction to the bank terminal 500 via the first baseband unit 10A and the bank mobile network operation platform 300. The information transmission uses ISO8583 specification, and may be made more secure by a cryptography system that is employed by the second electronic card 210 and the EMV application.

As a result, the mobile device 100 in accordance with this embodiment can be connected with an EMV card and perform the related operation such as authentication, credit card payment, online transaction, etc.

In brief, the baseband module 1 in accordance with this embodiment is operable to automatically switch the different components of the baseband module 1 to be connected to the first and second electronic card slots 2A and 2B, depending on the communication protocol employed by each of the first and second electronic cards 200 and 210. Therefore, the mobile device 100 may be able to communicate with various electronic cards.

In some examples, the control unit 12 is further configured to transmit a command signal to the first and second electronic cards 200 and 210 that is connected to a respective one of the first and second electronic card slots 2A and 2B, such that the first and second electronic cards 200 and 210 are configured to enter a simulated state selected from an activated state, a deactivated state, a reset state, and a disconnected (e.g., detached) state. In some examples, the first and second electronic cards 200 and 210 can be simulated as being first detached and then reconnected.

Figure 8:
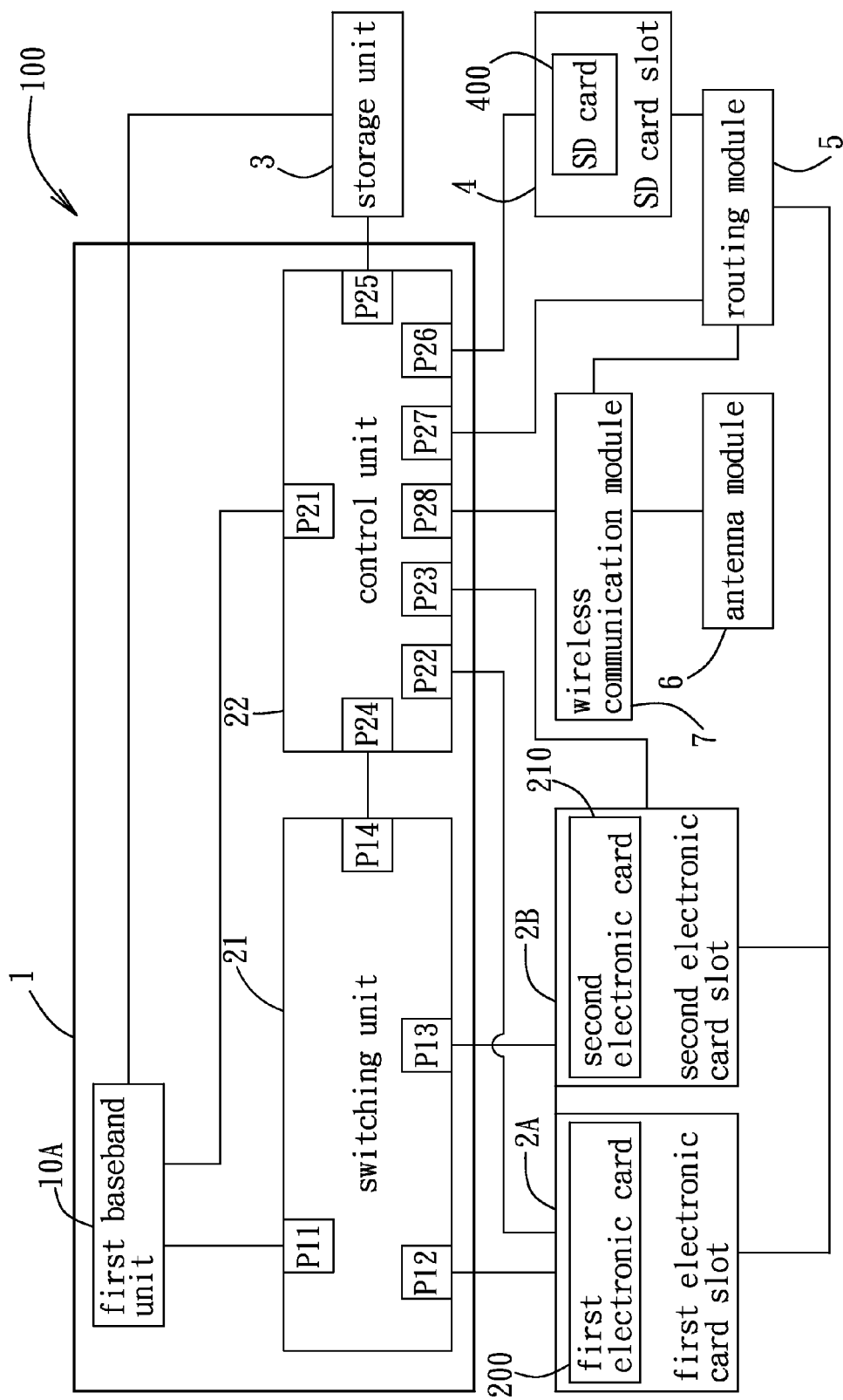
FIG. 8 is a schematic block diagram of a mobile device according to a second preferred embodiment of the present invention.

As shown in FIG. 8, the second preferred embodiment of the mobile device 100 according to the present invention has a structure similar to that of the embodiment illustrated in FIG. 4. The main difference between this embodiment and the previous embodiment resides in the following.

The mobile device 100 according to this embodiment further comprises a routing module 5, an antenna module 6, and a wireless communication module 7. The routing module 5 is coupled to the SD card slot 4, the control unit 12 and the first and second electronic card slots 2A and 2B. The wireless communication module 7 is coupled to the routing module 5 and the control unit 12. The antenna module 6 is coupled to the wireless communication module 7. The control unit 12 further includes the transmission ports P27 and P28 for coupling to the routing module 5 and the wireless communication module 7, respectively. The configurations of other components of the mobile device 100 are identical to those specified in the first embodiment, and details thereof are therefore omitted herein for the sake of brevity.

In the particular example illustrated by FIG. 8, the routing module 5 is one of a multiplexer and an analog switch component. The antenna module 6 is a non-contact antenna circuit module that supports radio-frequency identification (RFID) and ISO14443 specification.

In this embodiment, the control unit 12 is further configured to control operation of the routing module 5 to connect electrically one of the first and second electronic card slots 2A and 2B, the antenna module 6, and the SD card slot 4 to the wireless communication module 7. In some examples, the wireless communication module 7 may be in a floating state.

The wireless transmission module 7 is configured to support near field communication (NFC) technology, and can be connected to different components (e.g., the first baseband unit 10A, the storage unit 3, etc.) of the baseband module 1, such that the different components may be in communication wirelessly with nearby electronic devices. In some examples, the wireless communication module 7 supports single wire protocol (SWP) specification and/or sigin-sigout connection (S2C) interface, such that the first and second electronic cards 200 and 210 and the SD card 400 may be in communication wirelessly with nearby electronic devices as well, using the SWP specification and/or the S2C interface.

In some examples, the mobile device 100 can perform a point of sale (POS) procedure related to a standard POS. In one such example, the first electronic card 200 is a SIM card, and the second electronic card 210 is a purchase secure access module (PSAM) card. The mobile device 100 can therefore operate with an external non-contact EMV card (not shown in the Figures) that can interact with a standard POS.

Referring back to FIG. 6, the POS procedure will be described below. Firstly, the control unit 12 executes the executable program (i.e., the EMV application) stored in the storage unit 3, and the resulting control signal configures the transmission ports P23 and P28 to be connected, in order to connect electrically the PSAM card in the second electronic card slot 2B and the wireless communication module 7. The PSAM card is able to communicate with the non-contact EMV card via the wireless communication module 7 and/or the antenna module 6. Information related to the interaction between the PSAM card and the non-contact EMV card can be transmitted to the bank terminal 500 via the first baseband unit 10A and the bank mobile network operation platform 300. The transmission uses ISO8583 specification, and may be made more secure by a cryptography system that is employed by the second electronic card 210 and the EMV application. As a result, the operation between the non-contact EMV card and a conventional POS can be carried out by the mobile device 100 in this example. It is noted that, since the POS procedure is performed the control unit 12 and does not involve the operating system (OS) of the mobile device 100, the operation can be more secure from malicious programs designed to attack the OS of the mobile device 100.

The second preferred embodiment has the same advantages as those of the first preferred embodiment.

Figure 9:
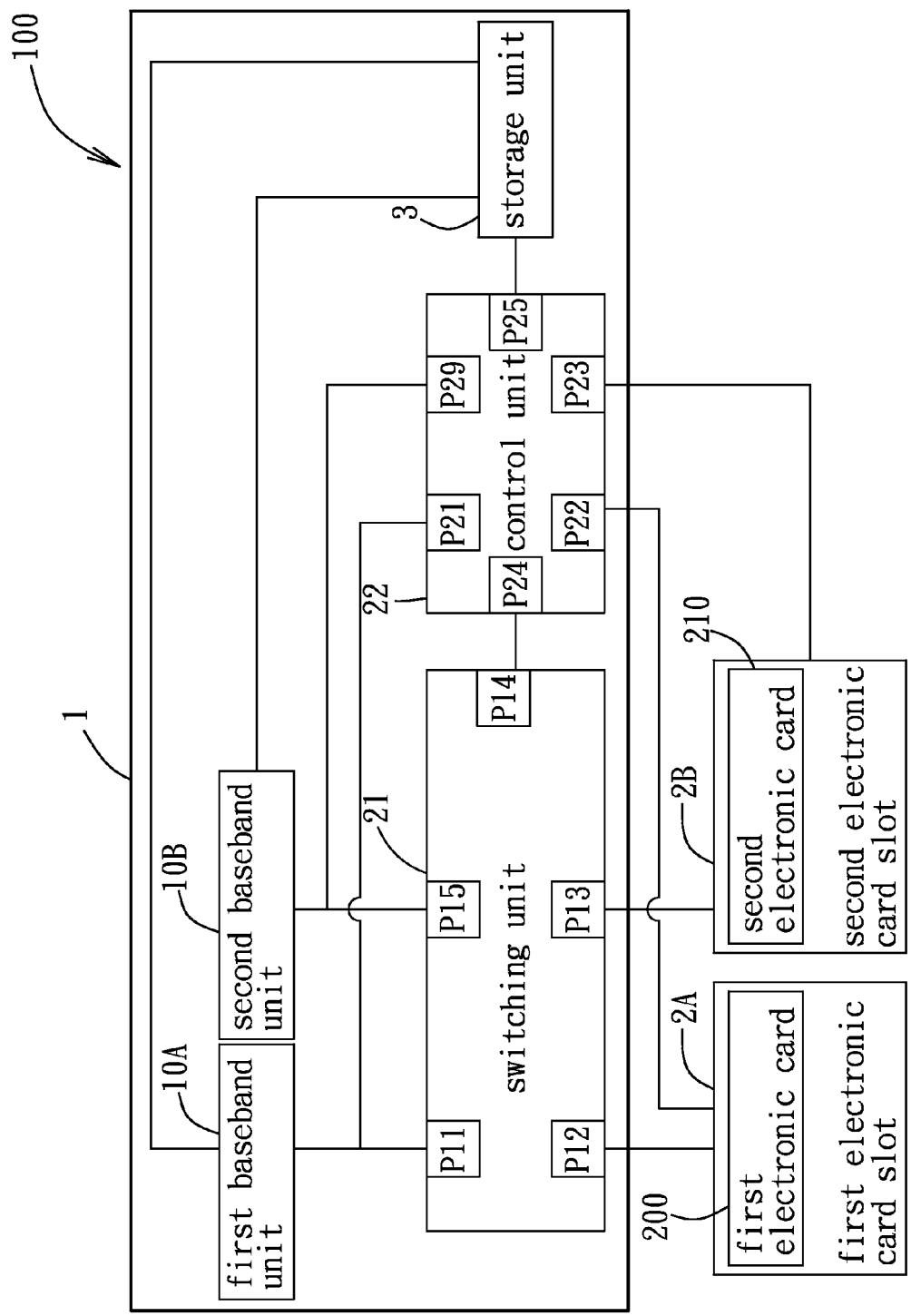
FIG. 9 is a schematic block diagram of a mobile device according to a third preferred embodiment of the present invention.

As shown in FIG. 9, the third preferred embodiment of the mobile device 100 according to the present invention has a structure similar to that of the embodiment illustrated in FIG. 2. The main difference between this embodiment and the previous embodiment resides in the following.

The storage unit 3 and the baseband module 1, in this embodiment, are implemented onto a single integrated circuit chip. In addition, the baseband module 1 further includes a second baseband unit 10B coupled to the switching unit 11 and the control unit 12. Similar to the first baseband unit 10A, the second baseband unit 10B may also include an application processor and a baseband processor (not shown in the Figures). Specifically, the switching unit 11 further includes a transmission port P15, and the control unit 12 further includes a transmission port P29 for coupling to the second baseband unit 10B. The configurations of other components of the mobile device 100 are identical to those specified in the first embodiment, and details thereof are therefore omitted herein for the sake of brevity.

The operation of the mobile device 100 in this embodiment is as follows. Based on the control signal generated by the control unit 12 executing the executable program, the baseband module 1 can be operable in the following three transmission modes.

In the first transmission mode, at least one of the first and second electronic cards 200 and 210 that conforms with the subscriber identification communication protocol is electrically interconnected to at least one of the first and second baseband units 2A and 2B. The electrical connection is made via the switching unit 11 and a corresponding one of the first and second electronic card slots 2A and 2B.

In the second transmission mode, at least one of the first and second electronic cards 200 and 210 that does not conform with the subscriber identification communication protocol is electrically interconnected to at least one of the first and second baseband units 2A and 2B. The electrical connection is made via the control unit 12 and a corresponding one of the first and second electronic card slots 2A and 2B.

In the third transmission mode, the first and second electronic card slots 2A and 2B are electrically interconnected via the control unit 12 such that the first and second electronic cards 200 and 210 connected respectively to the first and second electronic card slots 2A and 2B are able to communicate with each other.

In some examples, the first electronic cards 200 is a SIM card, and the second electronic card 210 is an EMV card. In such examples, the switching unit 11 may be configured to connect the transmission ports P11 and P12, and the transmission ports P13 and P14, respectively. The control unit 12 may be configured to connect the transmission ports P24 and P29. As such, each of the first and second electronic cards 200 and 210 is able to communicate with the first and second baseband units 10A and 10B, respectively. Subsequently, the mobile device 100 is capable of performing the operation of a mobile phone (e.g., phone call, text message, mobile network, etc.) and communicating with the bank mobile network operation platform 300 simultaneously.

Similar to the first embodiment, in some examples, the storage unit 3 and the baseband module 1 can be implemented onto a single integrated circuit chip. In some examples, the switching unit 11 and the control unit 12 are integrated with each other using one of hardware, software and a combination thereof.

The third preferred embodiment has the same advantages as those of the first preferred embodiment.

Figure 10:
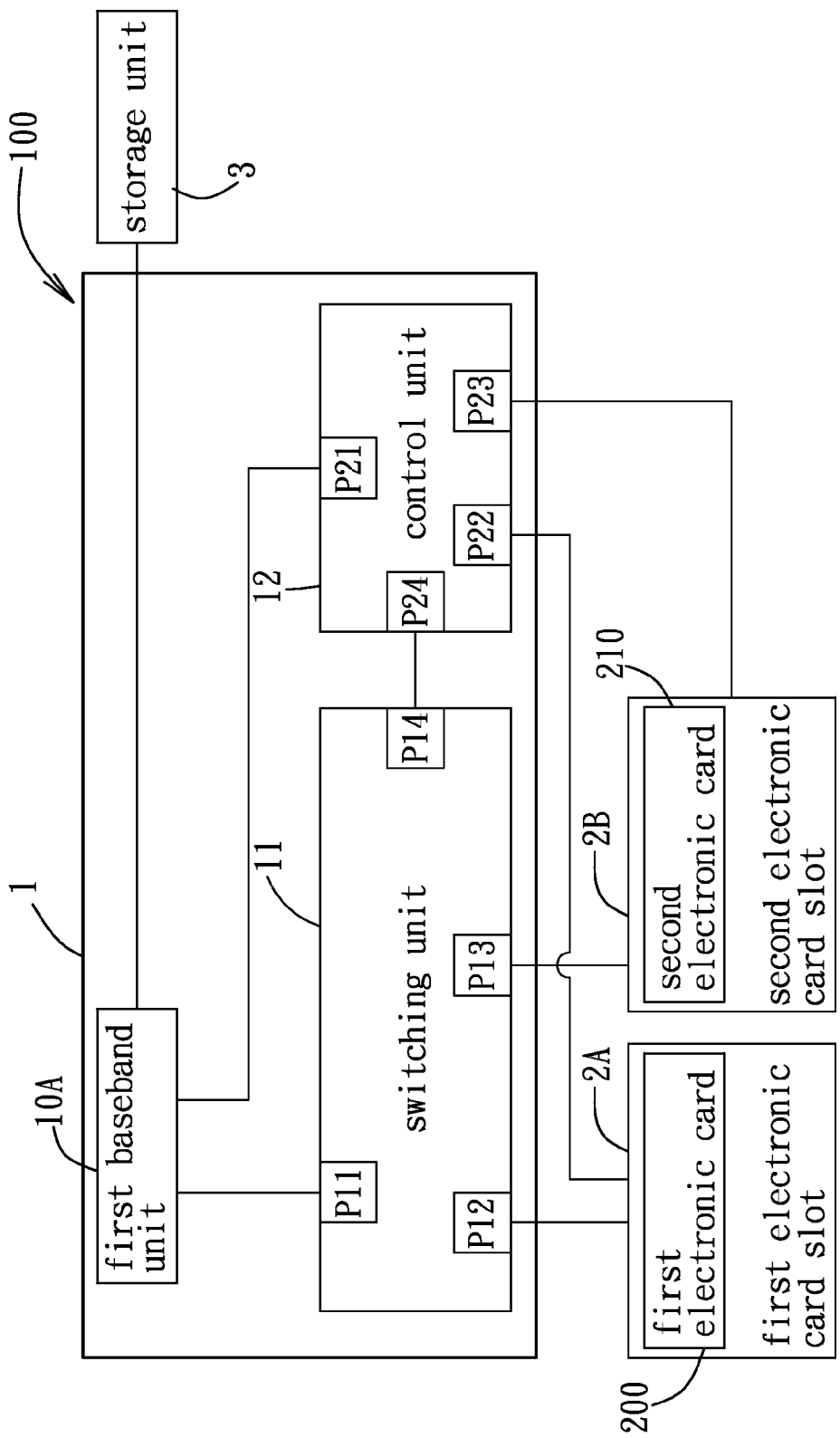
FIG. 10 is schematic block diagram of a mobile device according to a fourth preferred embodiment of the present invention.

As shown in FIG. 10, the fourth preferred embodiment of the mobile device 100 according to the present invention has a structure similar to that of the embodiment illustrated in FIG. 2. The main difference between this embodiment and the previous embodiment resides in the following.

In this embodiment, the storage unit 3 is coupled to the first baseband unit 10A, and the control unit 12 does not include the transmission port P25. As a result, the executable program stored in the storage unit 3 is alternatively downloaded by the baseband module 1 and transmitted to control unit 12 for execution. Subsequently, the communication involving the storage unit 3 is relayed by the baseband module 1 instead of the control unit 12. The fourth preferred embodiment has the same advantages as those of the first preferred embodiment.

To sum up, embodiments of the present invention provide a mobile device 100 with a configuration which allows communication with various electronic cards via the first and second electronic card slots 2A and 2B, which are typically designed exclusively for SIM cards. As a result, the mobile device 100 allows various operations to be performed thereon. In addition, the electronic cards 200 and 210 are able to communicate with the SD card 400 connected to the SD card slot 4 via different components of the baseband module 1. This configuration can be implemented using software, such that a conventional mobile device 100 is not required to be physically altered in order to implement of the present invention.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A mobile device, comprising:
   a first electronic card slot to be connected to a first electronic card; and
   a baseband module including
      a first baseband unit that includes an application processor and a baseband processor,
      a switching unit coupled to said first baseband unit and said first electronic card slot, and
      a control unit coupled to said first baseband unit, said first electronic card slot, and said switching unit;
   wherein said control unit of said baseband module is configured to operate in a first transmission mode, in which said first baseband unit and said first electronic card slot are electrically interconnected via said switching unit such that said first baseband unit is able to communicate with the first electronic card that is connected to said first electronic card slot, when it is determined by said control unit that the first electronic card conforms with a subscriber identification communication protocol;
   wherein said control unit of said baseband module is further configured to operate in a second transmission mode, in which said first baseband unit and said first electronic card slot are electrically interconnected via said control unit, when it is determined by said control unit that the first electronic card does not conform with the subscriber identification communication protocol;
   wherein the baseband module is an input/output device that supports ISO 7816/Universal Asynchronous Receiver/Transmitter (UART) specification; and
   wherein the first transmission mode enables operations related to mobile telephony service to be performed, and the second transmission mode enables operations concerning electronic commerce to be performed.

2. The mobile device of claim 1, further comprising a storage unit that is coupled to said control unit of said baseband module, wherein:
   in the first transmission mode, two of said first baseband unit, the first electronic card that is connected to said first electronic card slot, and said storage unit are electrically interconnected via said switching unit for communicating with each other; and
   in the second transmission mode, two of said first baseband unit, the first electronic card that is connected to said first electronic card slot, and said storage unit are electrically interconnected via said control unit for communicating with each other.

3. The mobile device of claim 2, wherein:
   said storage unit is stored with an executable program that can be downloaded by said baseband module and executed by said control unit so as to produce a control signal; and
   in each of the first and second transmission modes, said control unit is configured to determine said two of said first baseband unit, the first electronic card that is connected to said first electronic card slot and said storage unit to be electrically interconnected based on the control signal.

4. The mobile device of claim 2, further comprising a secure digital (SD) card slot coupled to said control unit and to be connected to an SD card, wherein:
   in the first transmission mode, two of said first baseband unit, the first electronic card that is connected to said first electronic card slot, said storage unit, and the SD card that is connected to said SD card slot are electrically interconnected via said switching unit for communicating with each other; and
   in the second transmission mode, two of said first baseband unit, the first electronic card that is connected to said first electronic card slot, said storage unit, and the SD card that is connected to said SD card slot are electrically interconnected via said control unit for communicating with each other.

5. The mobile device of claim 4, wherein:
   said storage unit is stored with an executable program that can be downloaded by said baseband module and executed by said control unit so as to produce a control signal; and
   in each of the first and second transmission modes, said control unit is configured to determine said two of said first baseband unit, the first electronic card that is connected to said first electronic card slot, said storage unit and the SD card that is connected to said SD card slot to be electrically interconnected based on the control signal.

6. The mobile device of claim 4, further comprising a routing module and an antenna module coupled to said routing module, said routing module being coupled to said first electronic card slot and said SD card slot and being configured to electrically connect said antenna module to one of said first electronic card slot and said SD card slot.

7. The mobile device of claim 4, further comprising:
   a routing module coupled to said SD card slot, said control unit and said first electronic card slot;
   a wireless communication module coupled to said routing module and said control unit; and
   an antenna module coupled to said wireless communication module;
   wherein said control unit is further configured to control operation of said routing module to connect electrically one of said first electronic card slot and said SD card slot to said wireless communication module.

8. The mobile device of claim 2, wherein said storage unit and said baseband module are implemented onto a single integrated circuit chip.

9. The mobile device of claim 8, wherein said storage unit is integrated into said control unit.

10. The mobile device of claim 1, further comprising a second electronic card slot to be connected to a second electronic card and coupled to said switching unit and said control unit, wherein:
   in the first transmission mode, at least one of said first and second electronic cards that conforms with the subscriber identification communication protocol is electrically interconnected to said first baseband unit via said switching unit and a corresponding one of said first and second electronic card slots; and in the second transmission mode, at least one of said first and second electronic cards that does not conform with the subscriber identification communication protocol is electrically interconnected to said first baseband unit via said control unit and a corresponding one of said first and second electronic card slots.

11. The mobile device of claim 10, wherein said control unit is further configured to operate in a third transmission mode, in which said first and second electronic card slots are electrically interconnected via said control unit such that the first and second electronic cards connected respectively to said first and second electronic card slots are able to communicate with each other, when it is determined by said control unit that neither one of said first and second electronic card conforms with the subscriber identification communication protocol.

12. The mobile device of claim 10, wherein said baseband module further includes a second baseband unit that includes an application processor and a baseband processor, and that is coupled to said switching unit and said control unit, in the first transmission mode, at least one of the first and second electronic cards that conforms with the subscriber identification communication protocol is electrically interconnected to at least one of said first and second baseband units via said switching unit and a corresponding one of said first and second electronic card slots; and in the second transmission mode, at least one of the first and second electronic cards that does not conform with the subscriber identification communication protocol is electrically interconnected to at least one of said first and second baseband units via said control unit and a corresponding one of said first and second electronic card slots.

13. The mobile device of claim 1, wherein said switching unit and said control unit are integrated with each other using one of hardware, software and a combination thereof.

14. A baseband module for communicating with a first electronic card connected to a first electronic card slot, said baseband module comprising:

a first baseband unit that includes an application processor and a baseband processor;

a switching unit coupled to said first baseband unit and to be coupled to the first electronic card slot; and a control unit coupled to said first baseband unit and said switching unit, and to be coupled to the first electronic card slot;

wherein said control unit is configured to operate in a first transmission mode, in which said first baseband unit and the first electronic card slot are electrically interconnected via said switching unit such that said first baseband unit is able to communicate with the first electronic card that is connected to the first electronic card slot, when it is determined by said control unit that the first electronic card conforms with a subscriber identification communication protocol;

wherein said control unit is further configured to operate in a second transmission mode, in which said first baseband unit and the first electronic card slot are electrically interconnected via said control unit such that said first baseband unit is able to communicate with the first electronic card that is connected to the first electronic card slot, when it is determined by said control unit that the first electronic card does not conform with the subscriber identification communication protocol;

wherein said baseband module is an input/output device that supports ISO 7816/Universal Asynchronous Receiver/Transmitter (UART) specification;

wherein the first transmission mode enables operations related to mobile telephony service to be performed; and the second transmission mode enables operations concerning electronic commerce to be performed.

15. The baseband module of claim 14, further comprising a storage unit coupled to said control unit, wherein:

in the first transmission mode, two of said first baseband unit, the first electronic card that is connected to the first electronic card slot, and said storage unit are electrically interconnected via said switching unit for communicating with each other; and in the second transmission mode, two of said first baseband unit, the first electronic card that is connected to the first electronic card slot, and said storage unit are electrically interconnected via said control unit for communicating with each other.

16. The baseband module of claim 15, wherein:

said storage unit is stored with an executable program that can be downloaded by said baseband module and executed by said control unit so as to produce a control signal; and in each of the first and second transmission modes, said control unit is configured to determine said two of said first baseband unit, the first electronic card that is connected to the first electronic card slot and said storage unit to be electrically interconnected based on the control signal.

17. The baseband module of claim 14, which is further for communicating with a second electronic card connected to a second electronic card slot, wherein said switching unit and said control unit are to be coupled to the second electronic card slot, in the first transmission mode, at least one of the first and second electronic cards that conforms with the subscriber identification communication protocol is electrically connected to said first baseband unit via said switching unit and a corresponding one of the first and second electronic card slots, and in the second transmission mode, at least one of the first and second electronic cards that does not conform with the subscriber identification communication protocol is electrically connected to said first baseband unit via said control unit and a corresponding one of the first and second electronic card slots.

18. The baseband module of claim 17, wherein said control unit is further configured to operate in a third transmission mode, in which the first and second electronic card slots are electrically interconnected via said control unit such that the first and second electronic cards connected respectively to the first and second electronic card slots are able to communicate with each other, when it is determined by said control unit that neither one of the first and second electronic card conforms with the subscriber identification communication protocol.

19. The baseband module of claim 14, wherein said control unit is further configured to transmit a command signal to the first electronic card that is connected to the first electronic card slot, such that the first electronic card is configured to enter a simulated state selected from an activated state, a deactivated state, a reset state, and a disconnected state.

20. A method for signal transmission to be implemented by a baseband module of a mobile device, the mobile device including an electronic card slot coupled to the baseband module and to be connected to an electronic card, and a storage unit coupled to the baseband module, the baseband module including a baseband unit, a switching unit and a control unit, said method comprising the following steps of:

- configuring the baseband module to operate in a first transmission mode, in which the baseband unit and the electronic card slot are electrically interconnected via the switching unit such that the baseband unit is able to communicate with the electronic card that is connected to the electronic card slot, when it is determined by the control unit that the electronic card conforms with a subscriber identification communication protocol; and
- configuring the baseband module to operate in a second transmission mode, in which the baseband unit and the electronic card slot are electrically interconnected via the control unit, when it is determined by the control unit that the electronic card does not conform with the subscriber identification communication protocol;
- wherein the baseband module is an input/output device that supports ISO 7816/Universal Asynchronous Receiver/Transmitter (UART) specification;
- wherein the first transmission mode enables operations related to mobile telephony service to be performed, and the second transmission mode enables operations concerning electronic commerce to be performed.

* * * * *